US008219128B2

(12) United States Patent
Zangi et al.

(10) Patent No.: US 8,219,128 B2
(45) Date of Patent: Jul. 10, 2012

(54) NETWORK-CENTRIC LINK ADAPTATION FOR COORDINATED MULTIPOINT DOWNLINK TRANSMISSION

(75) Inventors: Kambiz Zangi, Chapel Hill, NC (US); Abdulrauf Hafeez, Cary, NC (US); Dennis Hui, Cary, NC (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 508 days.

(21) Appl. No.: 12/483,603

(22) Filed: Jun. 12, 2009

(65) Prior Publication Data

US 2010/0317355 A1 Dec. 16, 2010

(51) Int. Cl.
*H04B 15/00* (2006.01)
*H04B 17/00* (2006.01)
*H04B 7/185* (2006.01)

(52) U.S. Cl. ............... 455/501; 455/67.11; 455/67.13; 370/317; 370/318

(58) Field of Classification Search ............ 455/452.2, 455/500, 501, 522, 63.1, 67.11, 67.13, 69; 370/317, 318
See application file for complete search history.

(56) References Cited

U.S. PATENT DOCUMENTS

| 6,947,748 | B2* | 9/2005 | Li et al. ................... 455/450 |
|---|---|---|---|
| 2010/0056171 | A1* | 3/2010 | Ramprashad et al. ..... 455/452.1 |
| 2010/0091893 | A1* | 4/2010 | Gorokhov ................. 375/260 |
| 2010/0173660 | A1* | 7/2010 | Liu et al. ................... 455/501 |
| 2010/0273514 | A1* | 10/2010 | Koo et al. ................. 455/501 |
| 2011/0194593 | A1* | 8/2011 | Geirhofer et al. .......... 375/224 |
| 2011/0319092 | A1* | 12/2011 | Kim et al. ................. 455/452.1 |
| 2012/0027110 | A1* | 2/2012 | Han et al. ................. 375/260 |

OTHER PUBLICATIONS

Motorola: "Coordinated Multi-Point Transmission—Coordinated Beamforming and Results" 3GPP Draft; R1-090793 Comp Results (Motorola), 3rd Generation Partnership Project (3GPP), Mobile Competence Centre, 650, Route Des Lucioles; F-06921 Sophia-Antipolis Cedex; France, no. Athens. Greece; 20090203, Feb. 3, 2009.
Texas Instruments: "Network MIMO Precoding" 3rd Generation Partnership Project (3GPP); Technical specification (TS), XX, XX, No. R1-082497 , Jul. 4, 2008.
Ericsson: "LTE-Advanced—Coordinated Multipoint transmission/ reception" 3GPP Draft; R1-082469 {COMP}, 3RD Generation Partnership Project (3GPP), Mobile Competence Centre; 650, Route Des Lucioles; F-06921 Sophia-Antipolis Cedex; France, vol. RAN WG1, no. Warsaw, Poland; 20080625, Jun. 25, 2008.
Texas Instruments: "Aspects of Coordinated Multi-point Transmission for Advanced E-UTRA" 3GPP Draft; R1-084444, 3rd Generation Partnership Project (3GPP); Mobile Competence Centre; 650, Route Des Lucioles; F-06921 Sophia-Antipolis Cedex; France, no. Prague, Czech Republic; 20081105; Nov. 5, 2008.

* cited by examiner

*Primary Examiner* — Andrew Wendell

(57) ABSTRACT

A Coordinated MultiPoint (CoMP) cell controller performs network-centric link adaptation for User Equipment (UE) in the CoMP cell. The CoMP cell controller receives at least infrequent channel estimates from a UE in the CoMP cell, from which it estimates downlink channel and thermal noise at the UE. The CoMP cell controller is aware of the desired signal to be received at the UE, and the intra-CoMP cell interference to the UE caused by transmissions to other UEs in the CoMP cell. The CoMP cell receives from the UE reports of inter-CoMP cell interference caused by transmissions by other CoMP cells. Based on the downlink channel quality, the desired signal, the intra-CoMP cell interference, the inter-CoMP cell interference, and the thermal noise, the CoMP cell controller performs link adaptation by selecting modulation and coding schemes, and other transmission parameters, for an upcoming transmission duration (such as a TTI).

14 Claims, 4 Drawing Sheets

NETWORK-CENTRIC LINK ADAPTATION FOR COORDINATED MULTIPOINT DOWNLINK TRANSMISSION

FIELD OF THE INVENTION

The present invention relates generally to wireless communication networks, and in particular to a network-centric system and method of downlink link adaptation for Coordinated Multi-Point (CoMP) cells.

BACKGROUND

Wireless cellular communication networks are well known and widely deployed, and provide mobile voice and data communications to millions of subscribers. In a cellular network, a fixed transceiver (base station, Node B, etc.) provides two-way radio communications with a plurality of subscribers within a geographic area, or cell (as used herein, the term sector is synonymous with cell). A sempiternal design goal of cellular communication networks is to efficiently and consistently deliver communication services to mobile subscribers at high data rates.

Many modern wireless communication protocols, such as High-Speed Downlink Packet Access (HSDPA) and the Long Term Evolution (LTE) of UTRAN utilize link adaptation to maximize the data rate of downlink communications under varying link quality. Link adaptation—also known in the art as adaptive modulation and coding—is a technique to maximize data rates by dynamically altering the modulation (e.g., QPSK, 16-QAM, 64-QAM), the level or degree of redundancy in Forward Error Correction (FEC) coding, and other signal and protocol parameters, to deliver the maximum rate to a UE given the radio link conditions. In link adaptation, the network transceiver selects from among a defined set of modulation techniques, coding schemes, and the like, based on an estimate of the instantaneous quality of the downlink channel to each UE. The Channel Quality Information is typically reported by the UE, and may comprise the Signal to Interference and Noise Ratio (SINR) measured or estimated by the UE. In Orthogonal Frequency Division Multiplexing (OFDM), the SINR vector over the sub-carriers allocated to a UE is $$SINR(t)=[SINR(k1;t)SINR(k2;t)\ldots SINR(K;t)],$$

where $SINR(k;t)$ is the SINR at sub-carrier "k" ($k=k1, k2, \ldots, K$) at time "t."

The $SINR(k;t)$ experienced by a UE, in general, depends on the desired signal transmitted to the UE, interference from transmissions to other UEs in the same sub-cell, interference from transmissions to other UEs in other sub-cells, and thermal noise. Conventional link adaptation can be described as UE-centric, in that each UE periodically measures $SINR(k;t)$, and these measurements are reported to the network—with a delay of several Transmission Time Intervals (TTI)—on the uplink, e.g., in Channel Quality Information (CQI) reports. A significant shortcoming of such UE-centric link adaptation is that in packet-oriented cellular system, the own-cell and other-cell interference typically change from one TTI to the next, depending on scheduling at the network transceivers. Accordingly, the UE-reported $SINR(k;t)$ is a very poor predictor of $SINR(k; t+d)$, where "d" is a positive delay. This poor predication leads to underutilization of precious radio resources, and can significantly reduce the overall spectral efficiency of the system. Furthermore, attempts to improve the predictive value of UE-reported $SINR(k; t+d)$ by increasing the CQI reporting frequency, to shorten "d," increase uplink congestion and interference, and reduce the uplink data.

The accurate prediction of instantaneous SINR experienced at UEs, to enable fast and accurate link adaptation, stands as a major challenge in wireless communication network design and operation.

SUMMARY

According to one or more embodiments disclosed and claimed herein, a network-centric link adaptation process is performed by each CoMP cell controller. The CoMP cell controller receives at least infrequent channel estimates from a UE in the CoMP cell, from which it estimates downlink channel quality and thermal noise at the UE. The CoMP cell controller is aware of the desired signal to be received at the UE, and the intra-CoMP cell interference to the UE caused by transmissions to other UEs in the CoMP cell. The CoMP cell receives from the UE reports of inter-CoMP cell interference caused by transmissions by other CoMP cells. Based on the downlink channel quality, the desired signal, the intra-CoMP cell interference, the inter-CoMP cell interference, and the thermal noise, the CoMP cell controller performs link adaptation by selecting modulation and coding schemes, and other transmission parameters, for an upcoming transmission duration (such as a TTI). The CoMP cell controller may facilitate the estimation of the inter-CoMP cell interference by not transmitting from the network transmitters serving the UE during certain intervals known to the UE.

DETAILED DESCRIPTION

A fundamental problem with conventional, UE-centric link adaptation is that, even at low speeds, own-cell interference and other-cell interference can change dramatically from one TTI to the next. The main reason for this rapid change is Time Divisions Multiple Access (TDMA) scheduling. In TDMA scheduling, each cell schedules each resource block (RB) independently; hence, in one TTI, a cell might decide to transmit on a particular RB, and this same cell might decide not to transmit on this RB in the next TTI. With multiple transmit antennas and fast linear precoding, the matrix-valued transmit power spectral density of the signal transmitted from each network transmitter (where each network transmitter may consists of one or more transmit antennas) on each RB might also change from one TTI to the next, depending on which UE is scheduled on each RB.

The fast time variations in own-cell interference and other-cell interference imply that there is often a large mismatch between the SINR measured by UE at time "t" and the SINR experienced by the UE at time "t+d." This mismatch in turn will lead to underutilization of rare radio resources, and can significantly reduce the overall spectral efficiency of the system.

In LTE, typically only one user is scheduled on each RB in each cell; hence, own-cell interference is typically zero in LTE. This implies that in LTE, the dominant source of errors in predicting SINR is the fast varying other-cell interference.

Coordinated multipoint (CoMP) is a technology to minimize inter-cell interference. A plurality of geographically contiguous cells—referred to as sub-cells—are grouped together to form a CoMP cell. Each CoMP cell has a central controller that coordinates transmission within its constituent sub-cells so as to maintain inter-cell interference within the CoMP cell (referred to herein as intra-CoMP cell interference) below a predetermined amount. The CoMP cell controller coordinates scheduling of transmissions to and from user equipment (UE) within the cells, and/or actively suppresses interference using signal processing techniques.

Figure 1:
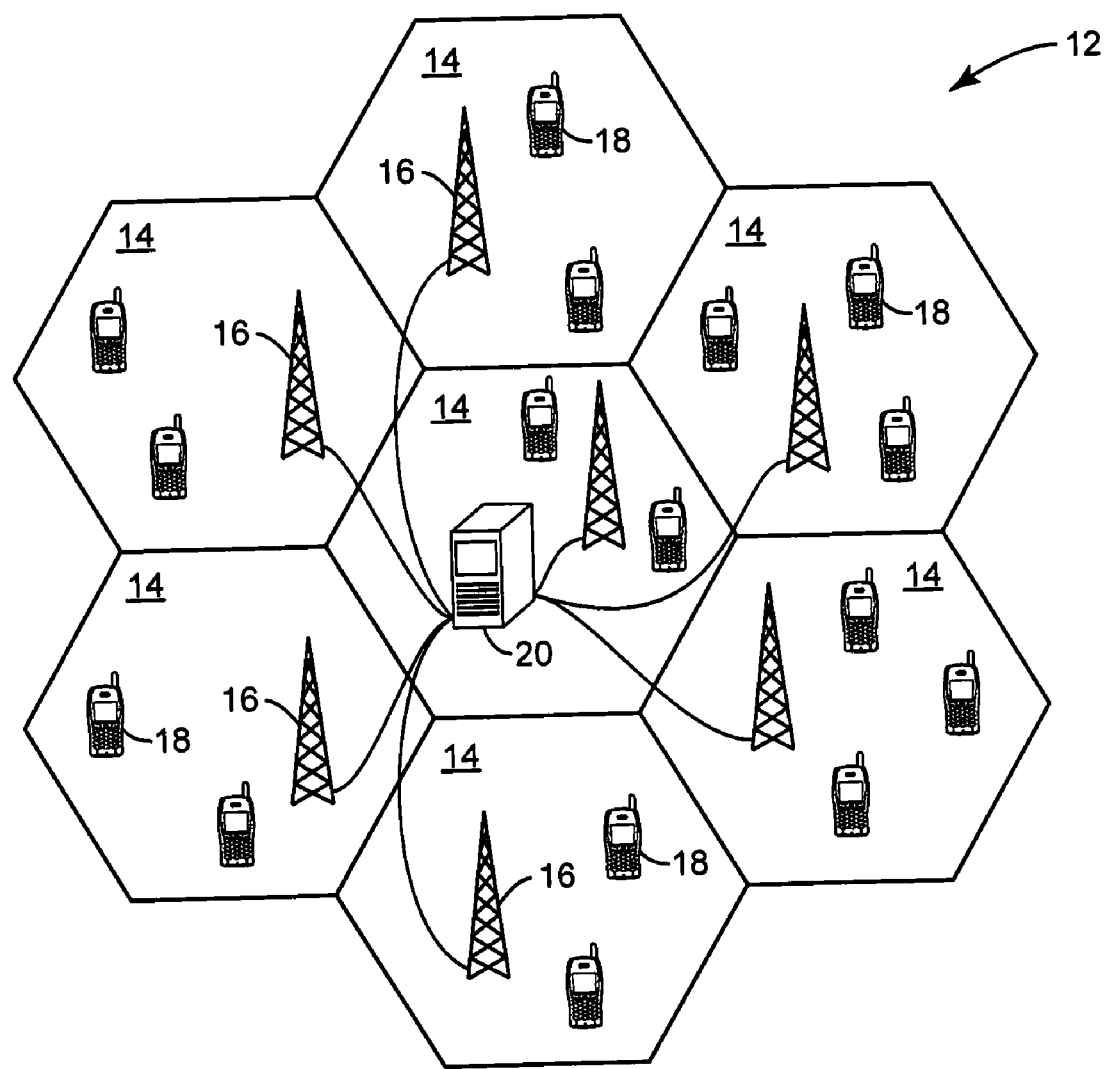
FIG. 1 is a functional block diagram of a Coordinated Multi-Point (CoMP) cell in a wireless communication network.

FIG. 1 depicts a Coordinated Multi-point (CoMP) cell 12 comprising, in this example, seven conventional cells, referred to herein as sub-cells 14. Each sub-cell 14 includes a network transceiver 16 (also known as a base station, NodeB, Access Point, or the like) providing wireless communications to subscribers within the sub-cell 14, including mobile UEs 18. A CoMP cell controller 20 (also known as Evolved NodeB or eNodeB) coordinates transmissions to UEs 18 within the CoMP cell to maximize data rates to selected UEs, while maintaining intra-CoMP cell interference below a predetermined level. The CoMP cell controller 20 may accomplish this through scheduling, and/or by combining weighted transmissions from two or more network transceivers 16 to any UE 18.

Figure 2:
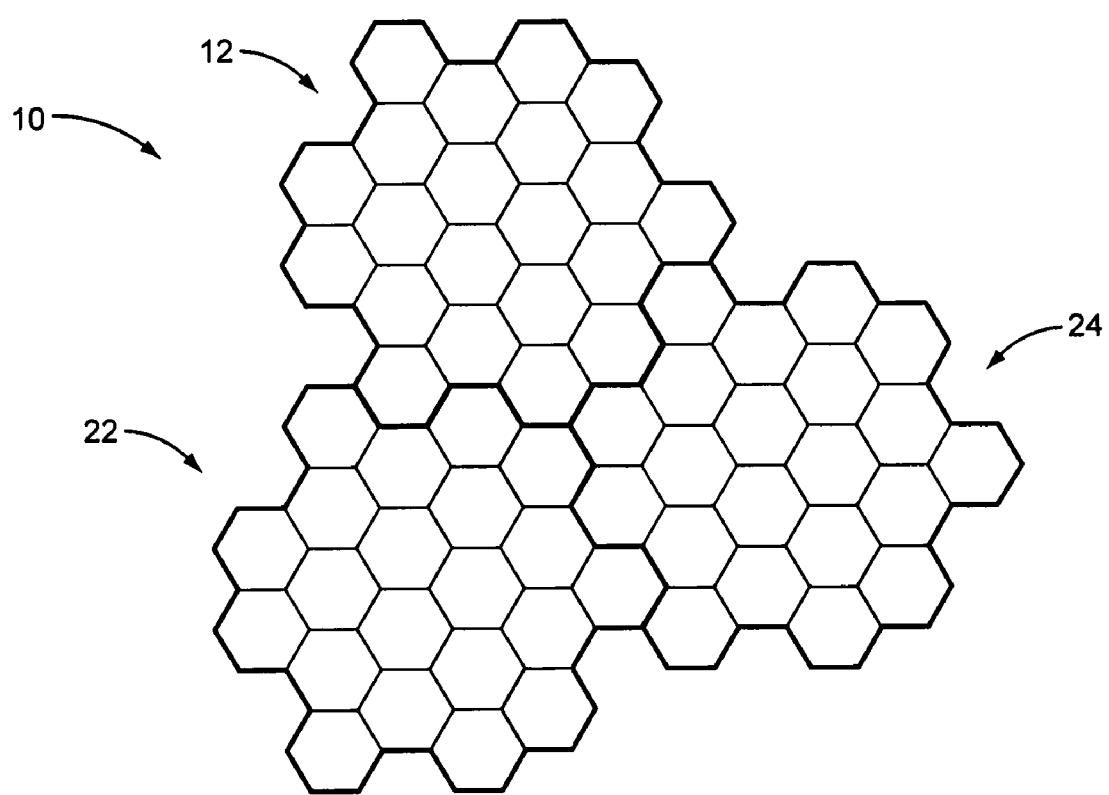
FIG. 2 is a functional block diagram of a plurality of CoMP cells in a wireless communication network.

FIG. 2 depicts a wireless communication network 10 comprising a plurality of CoMP cells 12, 22, 24, each of which comprises a plurality of sub-cells 14. While the CoMP cell controller 20 is effective in mitigating intra-CoMP cell interference within a single CoMP cell 12, it generally has no knowledge of transmissions scheduled in neighboring CoMP cells 22, 24. Accordingly, the CoMP cell controller 20 lacks information from which to estimate interference from other CoMP cells, or inter-Comp cell interference. The same deficiency described above regarding TDMA scheduling, and variations between own-cell interference and other-cell interference from one TTI to the next, also apply to intra-CoMP interference and intra-CoMP interference, respectively, as transmissions between different CoMP cells are not coordinated.

In CoMP systems with Channel State Information (CSI) available at the CoMP cell controller 20, the controller 20 in each CoMP cell 12 already has enough information to accurately predict most of the signals that contribute to SINR(k; t+d) during a given TTI. From the downlink channel state information to the UEs 18 served by a CoMP cell 12, the CoMP cell controller 20 can easily predict the desired signal to be observed by each UE 18 and the intra-CoMP cell interference to be observed by each UE 18. Furthermore, an estimate of the thermal noise and average inter-CoMP cell interference observed by each UE 18 can be reported back by the UE to the CoMP cell controller 20. This enables the CoMP cell controller 20 to perform accurate network-centric link adaptation. Such network-centric link adaptation not only improves downlink performance over conventional UE-centric link adaptation, it additionally reduces channel reporting by the UEs 18 on the uplink.

Consider a first UE 18, denoted $UE_0$, served by a first CoMP cell 12, denoted CoMP cell zero. Assuming the UE has a single receive antenna, the signal received by $UE_0$ can be expressed as $$r_0(k;t) = H_0(k;t)x_0(k;t) + \sum_{l \in S_0(k;t)} H_0(k;t)x_l(k;t) + I_{oth}(k;t) + W_0(k;t)$$

where $H_0(k;t)$ is the channel between the transmit antennas of the network transceivers 16 in CoMP cell zero and the antenna(s) of $UE_0$;

$x_i(k;t)$ is the signal transmitted from the transmit antennas of the network transceivers 16 in cell zero to the $i^{th}$ UE served by cell zero, with variance $\sigma_i^2(k;t)$;

$S_0(k;t)$ is the set of UEs that are served simultaneously with $UE_0$ by cell zero;

$I_{oth}(k;t)$ is inter-CoMP cell interference (that is, interference from CoMP cells other than CoMP cell zero) observed by $UE_0$, with variance $\sigma_{oth}^2(k;t)$; and $W_0(k;t)$ is thermal noise received, with variance $N_0(k;t)$.

The SINR(k;t) observed by $UE_0$ at sub-carrier "k: and time "t" can then be expressed as $$SINR(k;t) = \frac{|H_0(k;t)|^2 \sigma_0^2(k;t)}{|H_0(k;t)|^2 \sum_{l \in S_0(k;t)} \sigma_l^2(k;t) + \sigma_{oth}^2(k;t) + N_0(k;t)} \quad (1)$$

In a CoMP cell 12, the CoMP controller 20 is aware of all downlink channels to all the UEs 18 served by the CoMP cell 12. The CoMP cell controller 20 can thus estimate various quantities in equation (1) with greater precision than relying on measurements and reports from the UEs 18, with their concomitant delays.

In particular, the CoMP cell controller 20 is aware of (or at least estimates) the downlink channel quality to the UEs 18 that it serves, thus the quantity $H_0(k;t)$ is known. The CoMP cell controller 20 is also aware of the other UEs 18 in its own CoMP cell, thus the quantity $S_0(k;t)$ is known, as is $\sigma_i^2(k;t)$. The variance of the thermal noise at each UE 18 is constant over time and frequency; thus, it can be safely assumed that the CoMP cell controller 20 can easily acquire or estimate $N_0(k;t)$.

The only part of the equation (1) that is not known to the CoMP cell controller 20 is the interference seen by $UE_0$ due to the transmissions by other CoMP cells 22, 24. Given that different CoMP cells 12, 22, 24 act independently, there is no way that any one CoMP cell 12, 22, 24 can acquire this information. As discussed before, this inter-CoMP cells interference can change quite rapidly.

In one embodiment, each UE 18 computes the average of the power of inter-CoMP cell interference over all sub-carriers, and reports to its serving CoMP cell controller 20 just one frequency-independent average value for the power of inter-CoMP cell interference. A mechanism for UEs 18 to report to the network their observed average power (averaged over sub-carriers and time) of the inter-CoMP cell interference may be defined by extensions to the relevant network protocol. The network protocol extensions may also define how often such reports should be sent by each UE 18 to its serving CoMP cell controller 20. Since this reported quantity is frequency-independent, the amount of feedback required to implement the network-centric link adaptation is significantly less than the amount of feedback needed to implement conventional, UE-centric link adaptation. In some embodiments, a practical implementation may direct the UEs 18 to report the sum of intra-CoMP cell interference and thermal noise.

Figure 3:
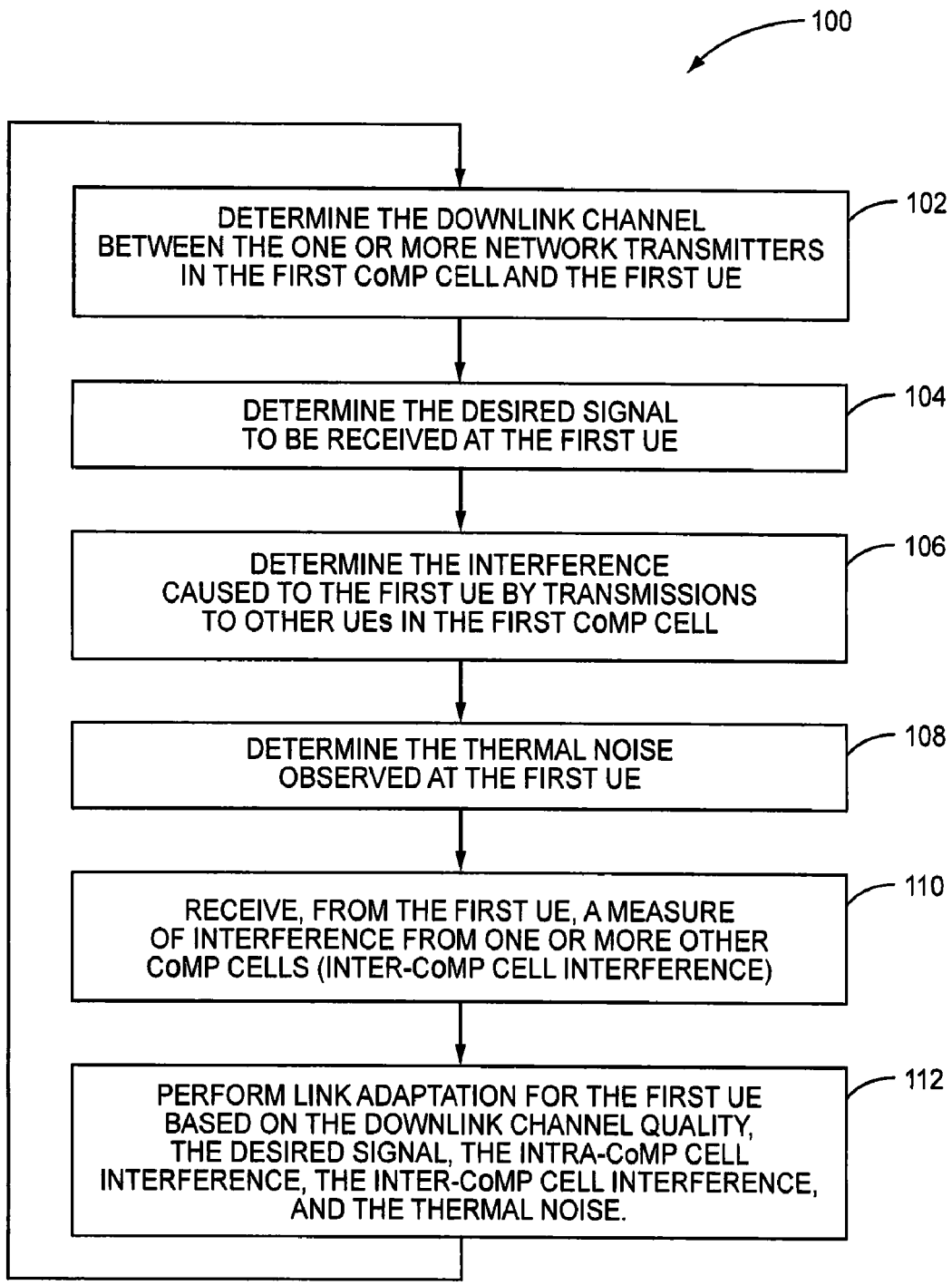
FIG. 3 is a flow diagram of a method of link adaptation by a CoMP cell controller.

FIG. 3 depicts a method 100 of performing network-centric link adaptation for a first UE 18, performed by a controller 20 of a first CoMP cell 12 comprising a plurality of network transceivers 16, each serving UEs 18 in respective sub-cells. The method 100 repeats at predetermined durations over which link adaptation is performed, for example, once per TTI. The CoMP cell controller 20 determines the downlink channel between one or more network transmitters 16 in the first CoMP cell 20 scheduled to transmit to the first UE 18, and receive antenna(s) of the first UE 18 (block 102). This may result from Channel State Information (CSI) or similar reports by the UE 18, based on reference, or pilot, symbols transmitted by the relevant network transmitters 16.

The CoMP cell controller 20 determines the desired signal to be received at the first UE 18 (block 104), such as for example an appropriately modulated and coded data packet received by the network 12. The CoMP cell controller 20 also determines the interference caused to the first UE 18 by transmissions to other UEs 18 in the first CoMP cell 12 (block 106). In many cases, the CoMP cell controller 20 utilizes sophisticated signal processing algorithms to weight transmissions from different network transmitters 16 so as to maximize the data rate to selected UEs 18, while simultaneously minimizing the interference presented to other UEs 18. Accordingly, the CoMP cell controller 20 is uniquely aware of the interference presented to any given UE 18 resulting from intra-CoMP cell interference.

The CoMP cell controller 20 further determines the thermal noise observed at the first UE 18 (block 108). Since the variance of the thermal noise at each UE 18 is constant over time and frequency, the thermal noise may be accurately estimated based on relatively infrequent reports from the UEs 18. Furthermore, the UEs 18 may average thermal noise measurements over frequency, reducing the number of reports required, and hence conserving uplink bandwidth.

Finally, the CoMP cell controller 20 receives from the first UE 18 a measure of interference from one or more other CoMP cells 22, 24 (block 110). In one embodiment, the UE 18 measurement of total inter-CoMP cell interference is facilitated by the CoMP cell controller 20 transmitting no symbols from any of its network transceivers 16 during a certain known interval. During such an interval, all signals received by the UE 18 are from other CoMP cells 22, 24. In one embodiment, the UE 18 averages the inter-CoMP cell interference over sub-carriers, and hence its uplink reporting is significantly reduced compared to conventional, UE-centric methods of link adaptation.

Based on the downlink channel quality, the desired signal, the intra-CoMP cell interference, the inter-CoMP cell interference, and the thermal noise, the CoMP cell controller 20 performs link adaptation for the first UE 18 by determining the modulation and coding, and other transmission parameters, to be applied to CoMP cell 12 transmissions to the first UE 18 during the next predetermined transmission duration, e.g., TTI (block 112). The method 100 then repeats for the next predetermined transmission duration (although not all steps, e.g., block 108, will necessarily be performed anew at each iteration).

Figure 4:
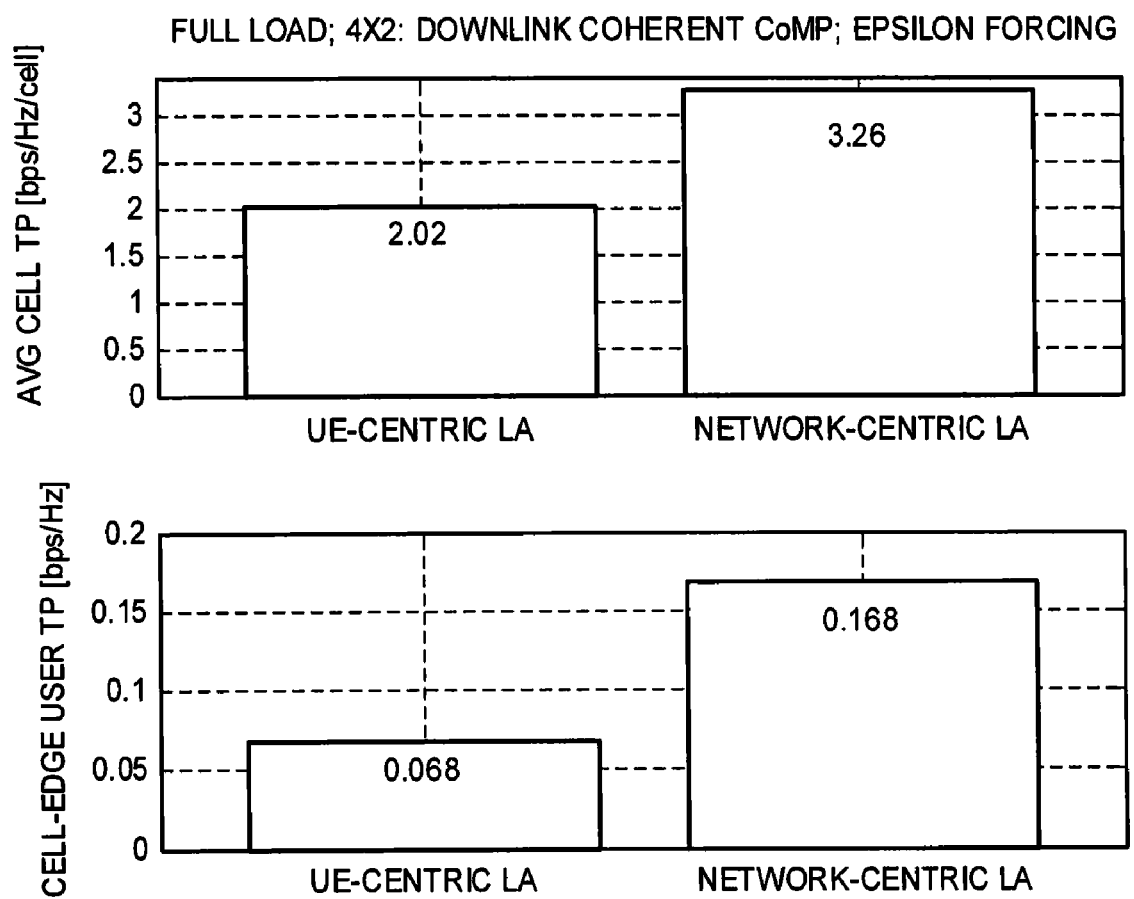
FIG. 4 depicts two graphs of simulation results.

FIG. 4 graphs the results of system-level simulations performed to compare the performance of conventional, UE-centric link adaptation to the performance of the inventive, network-centric link adaptation disclosed herein. The simulation environment comprised downlink transmissions in a CoMP system with seven sub-cells, each comprising three sectors—that is, 21 separately controllable network transceivers 16 per CoMP cell 12. The distance between sites of network transceivers 16 in the simulations was 500 meters.

Each network transceiver 16 has four transmit antennas, and each UE 18 has two receive antennas.

For an average offered load of two users per network transceiver 16, the simulations computed the overall spectral efficiency and cell-edge bit rate for two different link adaptation approaches—UE-centric and network-centric. As FIG. 4 depicts, the network-centric link adaptation results in approximately 50% higher spectral efficiency (throughput, measured in bits per second per Hz per cell) than the UE-centric link adaptation. Similarly, the network-centric link adaptation results in 90% higher achievable cell-edge bit rate than the UE-centric link adaptation (most inter-CoMP cell interference occur in sub-cells at the CoMP cell edges).

These simulation results show clear benefit in downlink efficiency for the network-centric approach to link adaptation. Additionally, the uplink benefits by reduced UE 18 CQI reporting, and reduced inter-CoMP cell interference reporting (by averaging such reports over sub-carriers). This reduction in uplink "overhead" allows limited uplink bandwidth to be allocated to data transmissions.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of network-centric link adaptation for a first User Equipment (UE), performed by a controller of a first Coordinated Multi-Point (CoMP) cell comprising a plurality of network transceivers, each serving UEs in respective sub-cells, comprising:
   determining the downlink channel quality between the one or more network transmitters in the first CoMP cell and the first UE;
   determining the desired signal to be received at the first UE;
   determining the interference caused to the first UE by transmissions to other UEs in the first CoMP cell;
   determining the thermal noise observed at the first UE; and
   performing link adaptation for the first UE based on the downlink channel quality, the desired signal, the intra-CoMP cell interference, and the thermal noise.

2. The method of claim 1 further comprising receiving, from the first UE, a measure of interference from one or more other CoMP cells, and wherein performing link adaptation for the first UE further comprises performing link adaptation also based on inter-CoMP cell interference.

3. The method of claim 2 wherein receiving a measure of interference from other CoMP cells comprises receiving a measure of interference observed by the first UE when no network transceiver in the first CoMP cell transmits symbols.

4. The method of claim 2 wherein receiving, from the first UE, a measure of interference from other CoMP cells comprises receiving a frequency-independent measure of interference from other CoMP cells.

5. The method of claim 3 wherein receiving a frequency-independent measure of interference from other CoMP cells comprises receiving a measure of observed interference from other CoMP cells averaged over sub-carrier and time.

6. The method of claim 2 wherein receiving, from the first UE, a measure of interference from other CoMP cells comprises receiving, from the first UE, a measure of interference from other CoMP cells and thermal noise.

7. The method of claim 2 wherein performing link adaptation for the first UE comprises estimating the Signal to Interference and Noise Ratio (SINR) for the first UE at sub-carrier "k" and time "t" as:

$$SINR(k;t) = \frac{|H_0(k;t)|^2 \sigma_0^2(k;t)}{|H_0(k;t)|^2 \sum_{l \in S_0(k;t)} \sigma_l^2(k;t) + \sigma_{oth}^2(k;t) + N_0(k;t)}$$

where $H_0(k;t)$ is the channel between the transmit antennas of the network transceivers in CoMP cell zero and the antenna(s) of the first UE;

$\sigma_i^2(k;t)$ is the variance of the signal transmitted from the transmit antennas of the network transceivers in the first CoMP cell to the first UE;

$S_0(k;t)$ is the set of UEs that are served simultaneously with the UE by the first CoMP cell;

$\sigma_{oth}^2(k;t)$ is the variance of intra-CoMP cell interference observed by first UE; and $N_0(k;t)$ is the variance of thermal noise observed at the first UE.

8. A Coordinated Multi-Point (CoMP) cell controller, comprising:

a communication interface to a plurality of network transceivers in a CoMP cell, each of the network transceivers providing wireless communications to User Equipment (UE) within a sub-cell of the CoMP cell; and a controller operative to communicate transmission parameters to the network transceivers so as to maximize the data rate to selected UEs and while presenting interference to other UEs in the CoMP cell below a predetermined amount, and further operative to perform link adaptation by determining the downlink channel quality between the one or more network transmitters in the first CoMP cell and the first UE;

determining the desired signal to be received at the first UE;

determining the interference caused to the first UE by transmissions to other UEs in the first CoMP cell;

determining the thermal noise observed at the first UE; and performing link adaptation for the first UE based on the downlink channel quality, the desired signal, the intra-CoMP cell interference, and the thermal noise.

9. The controller of claim 8 wherein the controller is further operative to receive, from the first UE, a measure of interference from one or more other CoMP cells, and wherein the controller is operative to perform link adaptation for the first UE also based on inter-CoMP cell interference.

10. The controller of claim 9 wherein the controller is operative to receive a measure of interference from other CoMP cells observed by the first UE when no network transceiver in the first CoMP cell transmits symbols.

11. The controller of claim 9 wherein the controller is operative to receive, from the first UE, a frequency-independent measure of interference from other CoMP cells.

12. The controller of claim 11 wherein the controller is operative to receive, from the first UE, a frequency-independent measure of interference from other CoMP cells averaged over sub-carrier and time.

13. The controller of claim 9 wherein the controller is operative to receive, from the first UE, a measure of interference from other CoMP cells and thermal noise.

14. The controller of claim 9 wherein the controller is operative to perform link adaptation for the first UE by estimating the Signal to Interference and Noise Ratio (SINR) for the first UE at sub-carrier "k" and time "t" as:

$$SINR(k;t) = \frac{|H_0(k;t)|^2 \sigma_0^2(k;t)}{|H_0(k;t)|^2 \sum_{l \in S_0(k;t)} \sigma_l^2(k;t) + \sigma_{oth}^2(k;t) + N_0(k;t)}$$

where $H_0(k;t)$ is the channel between the transmit antennas of the network transceivers in CoMP cell zero and the antenna(s) of the first UE;

$\sigma_i^2(k;t)$ is the variance of the signal transmitted from the transmit antennas of the network transceivers in the first CoMP cell to the first UE;

$S_0(k;t)$ is the set of UEs that are served simultaneously with the UE by the first CoMP cell;

$\sigma_{oth}^2(k;t)$ is the variance of intra-CoMP cell interference observed by first UE; and $N_0(k;t)$ is the variance of thermal noise observed at the first UE.

* * * * *

UNITED STATES PATENT AND TRADEMARK OFFICE
CERTIFICATE OF CORRECTION

| | | |
|---|---|---|
| PATENT NO. | : 8,219,128 B2 | Page 1 of 1 |
| APPLICATION NO. | : 12/483603 | |
| DATED | : July 10, 2012 | |
| INVENTOR(S) | : Zangi et al. | |

It is certified that error appears in the above-identified patent and that said Letters Patent is hereby corrected as shown below:

In Column 4, Line 19, delete ""k:" and insert -- "k" --, therefor.

Signed and Sealed this
Twelfth Day of February, 2013

Teresa Stanek Rea
*Acting Director of the United States Patent and Trademark Office*